United States Patent [19]

Leach

[11] Patent Number: 4,723,972
[45] Date of Patent: Feb. 9, 1988

[54] GAS SEPARATION SYSTEM

[76] Inventor: Sam L. Leach, P.O. Box 1190, Pebble Beach, Calif. 93953

[21] Appl. No.: 5,746

[22] Filed: Jan. 21, 1987

[51] Int. Cl.⁴ .............................................. B01D 45/16
[52] U.S. Cl. ..................................... 55/345; 55/398; 55/399; 55/434
[58] Field of Search ............... 55/1, 17, 159, 345–348, 55/355, 392–399, 434

[56] References Cited

U.S. PATENT DOCUMENTS

| | | | |
|---|---|---|---|
| 789,049 | 5/1905 | Middleton | 55/397 |
| 1,039,008 | 9/1912 | Anderson | 55/398 X |
| 1,311,358 | 7/1919 | Plaisted | 55/393 |
| 1,582,603 | 4/1926 | Hooper | 55/397 |
| 2,420,840 | 5/1947 | Piquerez | 55/396 |
| 3,885,933 | 5/1975 | Putney | 55/397 |
| 4,059,419 | 11/1977 | Ross | 55/399 X |
| 4,231,763 | 11/1980 | Baisden | 55/1 |
| 4,268,277 | 5/1981 | Rooker | 55/398 X |
| 4,278,550 | 7/1981 | Watts | 55/17 X |
| 4,469,495 | 9/1984 | Hiraizumi et al. | 55/159 X |

FOREIGN PATENT DOCUMENTS 364449 1/1932 United Kingdom ................. 55/397

*Primary Examiner*—Robert Spitzer
*Attorney, Agent, or Firm*—Poms, Smith, Lande & Rose

[57] ABSTRACT

A gas separator system for separating gases of substantially different molecular weights, such as oxygen and carbon monoxide, includes a series of concentrically nested coils, with the output of each coil being connected to the input of the next coil. Gas is directed through the coils at high velocity to cause laminar flow in the tubes of the coils, with the heavier gas flowing through the tubing adjacent the outer periphery of each coil of tubing, as a result of centrifugal force, and the lighter gas being forced to flow near the inner surface of the tubing of each coil. Starting one or two turns from the input to each coil, after laminar flow is established, small openings are provided at the outer periphery, or preferably at the inner surfaces of the tubing making up the coils, whereby one of the gases selectively flows out of the coils of tubing into an enclosing housing. A gas storage container may be provided to receive the gas which flows into the enclosing housing; and a water tank, and pumps to direct water flow between the gas storage container and the water tank may be employed to provide reduced pressure in the gas storage container. Conventional vacuum or gas pumps may also be provided to reduce the pressure in the storage tank and the enclosing chamber or to direct the separated gas as desired.

20 Claims, 5 Drawing Figures

CO — ●
O — ○

CO — ●
O — ○

GAS SEPARATION SYSTEM

BACKGROUND OF THE INVENTION

Various methods and apparatus have been proposed heretofore to separate gases. For example, carbon monoxide has been separated from oxygen by bubbling the gas mixture through water, with the carbon monoxide being selectively absorbed into the water. Apparatus have also been proposed to separate gases through their differing magnetic properties. However, these systems have not been entirely satisfactory, with incomplete separation in some cases, and with at least one of the gases not being readily available, as in the case of the absorption of carbon monoxide into water.

Accordingly, an important object of the invention is to provide a system for accomplishing relatively complete separation of gases, with the output gases being directly available in gaseous form.

SUMMARY OF THE INVENTION

In accordance with the present invention a mixture of gases of significantly different molecular weights is applied at high velocity to a coil of tubing having a series of turns, so that laminar flow is produced in the tubing, with the heavier gas toward the outer periphery of the coils of tubing, and the lighter gas flowing adjacent the inner side of each turn of tubing. Small openings are provided at either the outer or preferably the inner surfaces of each turn of tubing other than the input turn or two, to permit selective flow of one of the gases into an enclosing housing.

In accordance with a more specific aspect of this invention, carbon monoxide and oxygen may be supplied to the coils of tubing at a high velocity and at a relatively high temperature, so that the oxygen gas is in its monatomic state, and the lower molecular weight oxygen is drawn off through small openings at the inner surfaces of the coils, into the enclosing housing which is maintained at a reduced pressure.

In accordance with an additional aspect of the invention, an additional gas collection or storage chamber is coupled to this enclosing housing to collect and store one of the separated gases prior to utilization. A water tank may also be provided, along with arrangements for pumping water between the water tank and the gas collection and storage chamber, to maintain the storage chamber at the desired reduced pressure. Gas pumps may be provided for (1) reducing the pressure in the enclosing housing or the storage tank, (2) transmitting the collected gas to a desired external location and/or (3) for compressing the collected gas for long term storage.

Other objects, features and advantages of the invention will become apparent from a consideration of the following detailed description and from the accompanying drawings.

DETAILED DESCRIPTION

Figure 1:
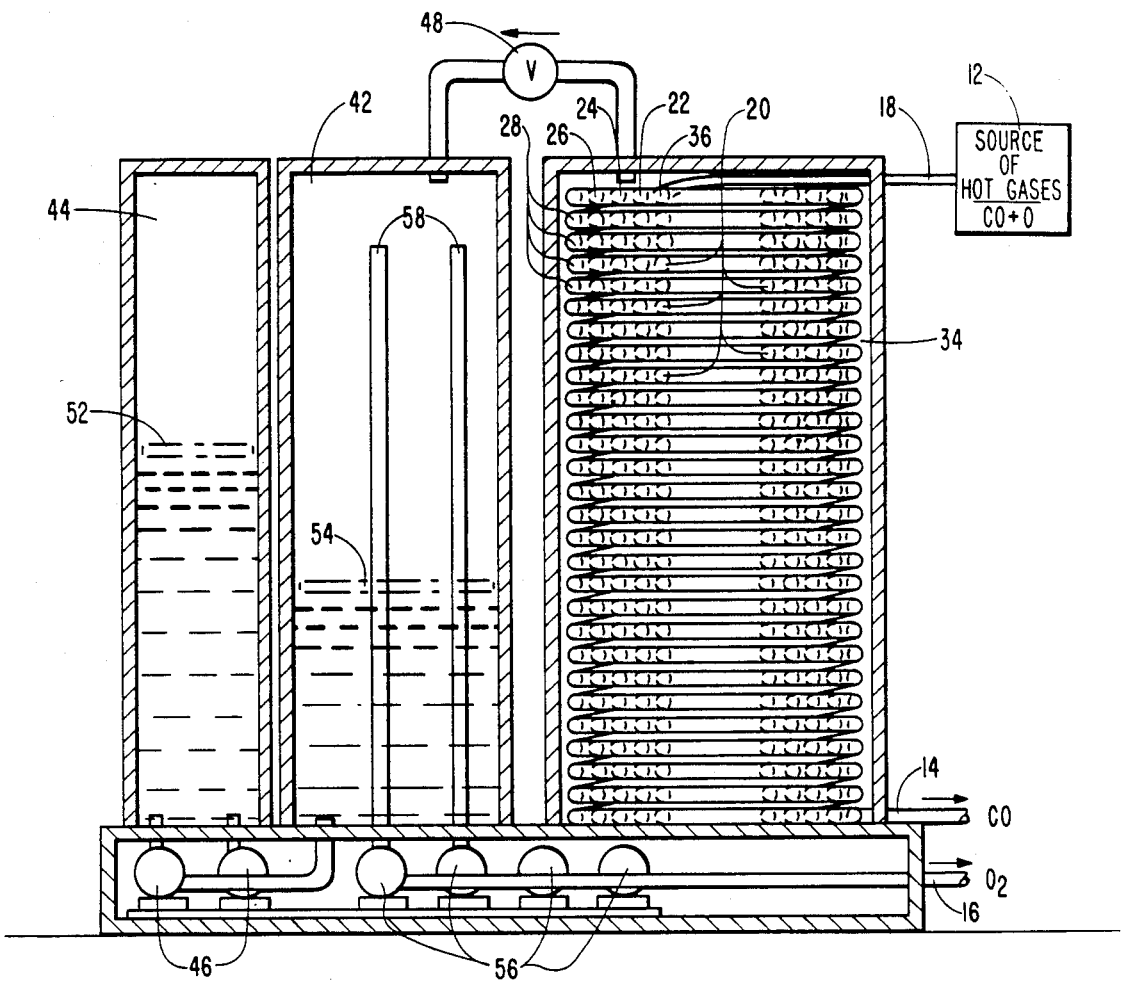
FIG. 1 is an overall view of a gas separation system illustrating the principles of the present invention.

Referring more particularly to the drawings, FIG. 1 shows a complete system in accordance with the present invention whereby mixed gases from a source such as that shown at 12 in the drawings, are separated so that the component gases, separated from one another, appear at the output conduits 14 and 16. In the particular example with which the inventor was concerned, the two gases which were applied to the input conduit 18 were carbon monoxide and oxygen, at a temperature of approximately 1100 degrees Fahrenheit, wherein the oxygen was in the monatomic form as a single atom of oxygen, rather than in its diatomic form, usually shown as $O_2$, which is the form taken by oxygen at room temperatures, and as it is present in the earth's atmosphere.

The mass of one gram-mole of oxygen atoms is precisely 15.9994 grams, and consequently the mass for one oxygen atom is $2.656383862 \times 10^{-23}$ grams. Similarly, the mass of one gram-mole of carbon monoxide molecules is 28.01055 grams, and consequently the mass for one carbon monoxide molecule is $4.650597709 \times 10^{-23}$ grams.

In the system of the present invention, the difference in the mass between the carbon monoxide and the oxygen molecules is employed to separate the two gases as a result of the centrifugal and centripetal forces acting on the molecules of the gases as they are applied to the coils 20, 22, 24, 26 and 28 at relatively high pressures and resultant velocities. For convenience, and because these terms will be used in the following description, it is noted that the word "centrifugal" means "proceeding or acting in a direction away from a center or axis"; and the word "centripetal" means "proceeding or acting in a direction toward a center or axis".

Figure 3:
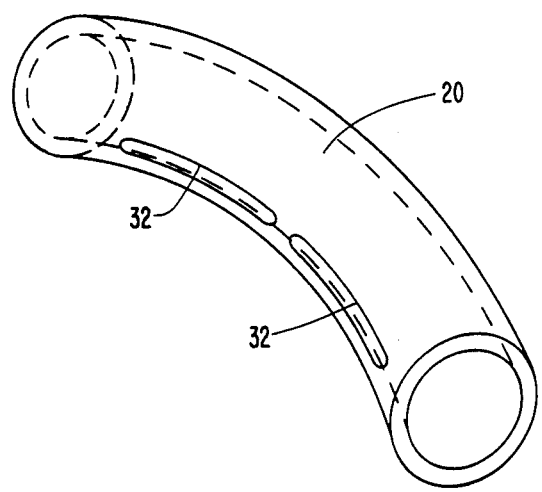
FIG. 3 shows the ports in the coils of tubing whereby the lighter gas is separated from the heavier gas.

In the present case, the greater mass of the carbon monoxide molecules will apply a centrifugal force to carbon monoxide, which is substantially greater than the centrifugal force applied to the oxygen, and accordingly, the carbon monoxide will displace the oxygen adjacent the outer periphery of the tubing in the coils through which the mixed gases pass. Small slots 32 are provided on the inner surface of the coils such as coil 20, as shown in FIG. 3, after the first few turns of the coil 20, following the establishment of laminar flow within the tubes. With the enclosing chamber 34 maintained at a somewhat reduced pressure, an inward, or centripetal force arising from the gas pressure within the tubes, will cause oxygen flow through these slots 32 into the enclosing chamber 34.

Now, returning to FIG. 1 of the drawings, the conduit 18 is coupled at point 36 to the innermost coil 20, having the smallest radius. At the bottom of the assembly, the lowermost turn of coil 20 is coupled to the lowermost turn of the coil of tubing 22, so that the gas follows a circular path back up to the top of the chamber 34, with the successive coils from the coil 20 to coil 28 being coupled to one another, with the lowermost turn of the outer coil 28 being connected to the exit conduit 14 for the carbon monoxide.

It is again noted that each of the coils of tubing 20, 22, 24, 26 and 28 has a series of slots 32 as shown in FIG. 3 on the inner surface of each turn of the coil, with the exception of the first couple of turns, which are excluded in view of the probability that laminar flow will not have been established until the gases have been directed through a couple of turns of each coil.

In addition to the enclosure 34, the system of FIG. 1 includes a gas storage chamber 42 which is normally maintained at a reduced pressure or partial vacuum, and the water tank 44. The pumps 46 are provided to pump water back and forth between the water tank 44 and the gas storage chamber 42. By initially filling the gas storage chamber 42 substantially full of water, and then gradually lowering the level of the water, any desired partial vacuum may be accurately provided within the chamber 42. Of course, with the valve 48 open, this will provide a corresponding reduced pressure within the chamber 34.

Incidentally, floats 52 and 54 may be provided within the water tank 44 and the gas storage chamber 42, respectively, to avoid or to reduce exposure between the gas in the chamber 42 and the water. The gas or vacuum pumps 56 are provided to withdraw gas from the chamber 42 and direct the gas to the output conduit 16. The conduits 58 extend to a point near the top of the gas storage chamber 42 so that the upper ends of the conduits 58 are always above the levels of the water which may be present in the gas storage chamber 42. It is to be understood that, if desired, the water tank 44 could be dispensed with, and the pressure within the gas storage chamber 42 controlled entirely by the pumps 56. However, through the use of the supplemental water tank, and the controlled level of water within the gas storage chamber 42, the pressure within the gas storage chamber 42 and the enclosure 34 may be accurately controlled; and if desired, the pumps 56 need only be actuated intermittently to exhaust the gas stored within the chamber 42. If desired, during the period when the oxygen is being drawn off from the chamber 42, the valve 48 interconnecting chambers 42 and 34 may be closed, and the water level within the gas storage chamber 42 raised, to assist in forcing out the gas stored within the chamber 42.

Figure 2:
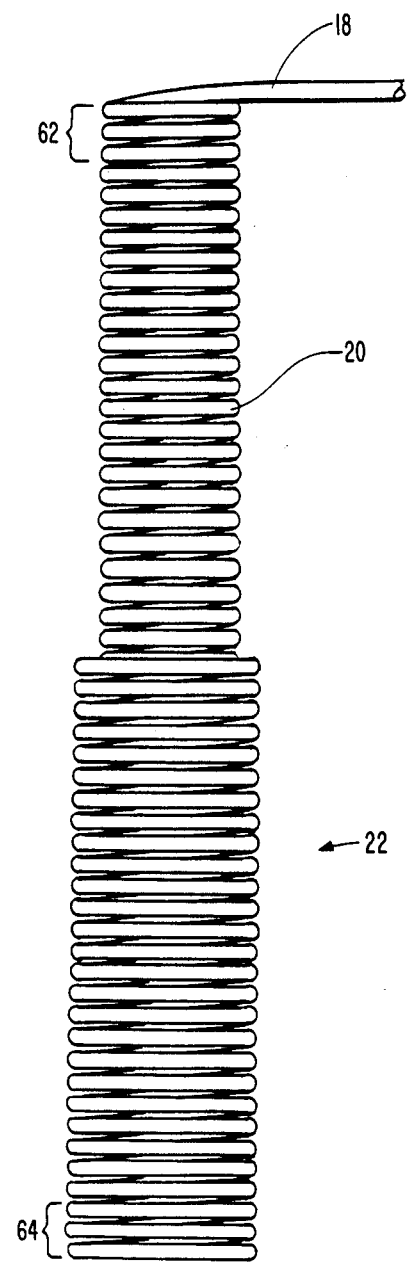
FIG. 2 shows two of the separator coils of tubing employed in the system of FIG. 1.

FIG. 2 is an exploded view showing the two inner coils 20 and 22 separated from one another. It may be observed from FIG. 2 that the input mixed gases are initially applied to the innermost coil 20. Of course, this coil has the smallest radius, and accordingly the greatest centrifugal force. With the gas concentration being highest, in this innermost coil 20, it is advantageous to have the maximum separating force present in this coil rather than initially applying the gases to one of the outer coils having a larger radius. As mentioned above, the openings or ports such as those shown in FIG. 3 are not provided until laminar flow is established within the coils of tubing. Accordingly, for example, the top two or three turns 62 of the coil 20 would not have any ports 32 (see FIG. 3). Similarly, the first few turns 64 of coil 22, at the bottom thereof, where the lowermost turn of the coil 20 is coupled to the lowermost turn of the coil of tubing 22, would also be free of gas retrieval ports.

Figure 4:
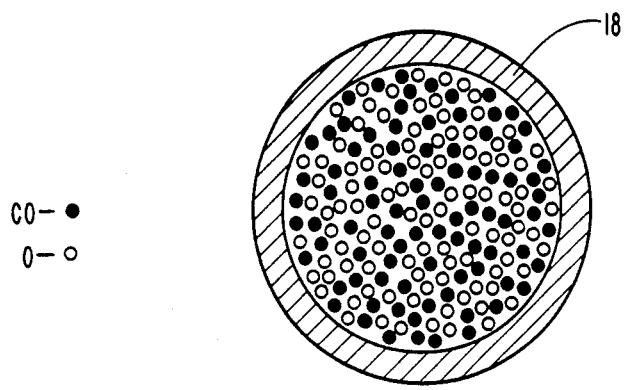
FIG. 4 is a diagrammatic showing of the mixed gases prior to separation.
Figure 5:
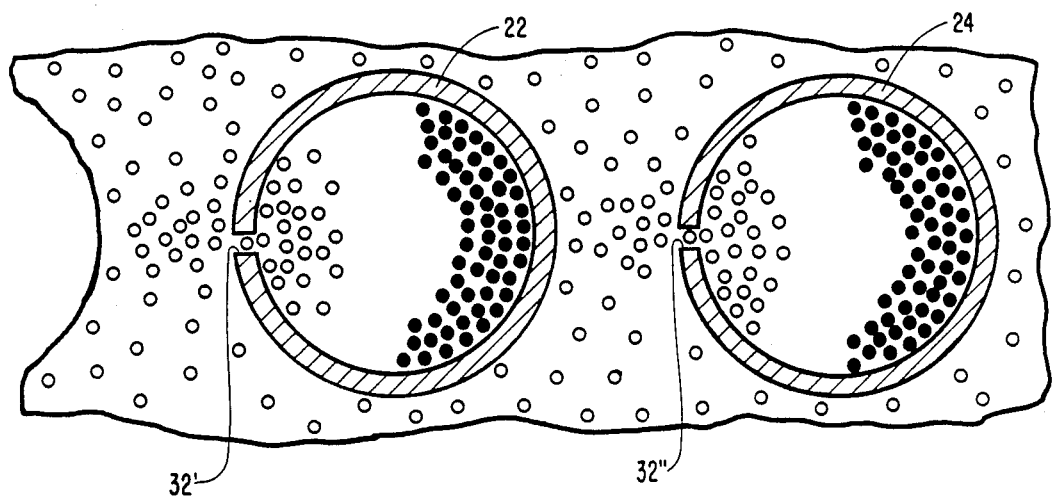
FIG. 5 is a diagrammatic showing of the laminar flow of the lighter and heavier gases, and illustrates how the lighter gases are drawn off from the coils of tubing.

FIGS. 4 and 5 are diagrammatic showings of the mode of separation of the mixed gases. More specifically, in both FIGS. 4 and 5, the carbon monoxide molecules are diagrammatically shown as darkened dots, while the monatomic oxygen molecules are shown as circles with open centers. In FIG. 4, it may be seen that the carbon monoxide and the oxygen are fairly uniformly distributed throughout the entire cross-section of the input tube 18. In FIG. 5, the cross-section shown is that of coils 22 and 24, with one tube of each being shown, along with the oxygen retrieval or escape ports 32' and 32" being associated with coils 22 and 24, respectively. The center of the chamber 34 is located to the left, as shown in FIG. 5, and accordingly, the ports 32' and 32" are toward the center of each of the coils of tubing, 22 and 24. It may be noted from FIG. 5, that laminar gas flow is occurring in both of the coils of tubing 22 and 24, with the heavier carbon monoxide being to the right or to the outside of the tubes, and the lighter monatomic oxygen being to the left, and passing through the ports 32' and 32", into the enclosure 34, as shown in FIG. 1.

In conclusion, it is to be understood that the foregoing detailed description and the accompanying drawings relate to a preferred embodiment of the invention. However, various changes and alternative constructions may be employed to implement the invention. Thus, by way of example and not of limitation, instead of using retrieval ports for the lighter gas on the inner surfaces of the circular tubing, retrieval ports may be provided on the outer surface of the circular tubing to collect the heavier gas or gases. In addition, instead of employing a series of concentric coils 20 through 28 as shown in FIG. 1 of the drawings, a series of flat spiral coils of tubing could be employed; further, instead of applying the input gas to the coils in series, the gas could be applied to all of the coils of tubing in parallel, with suitable manifolding and changes in cross-sectional diameter at the input and the output to the sets of coils. Also, instead of using water in the chambers 42 and 44, other liquids could be employed. Accordingly, it is to be understood that the present invention is not limited to that precisely as shown in the drawings or as described in the foregoing detailed description.

In the following appendix, certain fundamental mathematical and related background information and analysis will be set forth, which is useful in understanding the present invention.

APPENDIX

SEPARATING CO AND O, FOR SEPARATE DELIVERY AS CO AND O, MOLECULES, ON A CONTINUOUS BASIS

The two gases CO, and O, are gases with differential masses, which means that CO gas can be selectively separated from O gas at temperatures that make it impractical by known methods that are used commercially to separate these and other gases.

Separation can be achieved by inducing stratified, or laminar flow in a moving stream constrained in curved tubes, because of their $\Delta M$, or differential masses.

The mass of a gram-mole of oxygen atoms is precisely 15.9994 (g), consequently the mass for one oxygen atom is $2.656383862 \times 10^{-23}$ (g).

The mass of a gram-mole of CO molecules is 28.01055 (g), consequently the mass for one CO molecule is $4.650597709 \times 10^{-23}$ (g).

A. Assume we are moving 1.0 cubic foot of CO+O gas through a two inch (outside diameter) tube, that has been coiled in a continuous circular form with on inch free-space separating the coils from each other-on a 24 inch (outer radius), with a helix spiral configuration.

B. A second independent tube fits inside the above helix coil, an exact duplicate with an outer diameter of 42 inches.

C. A third independent tube fits inside the second helical coil, an exact duplicate of the second but with an outer-diameter of 36 inches.

D. A fourth independent tube fits inside the third helical coil, an exact duplicate of the third but with an outer diameter of 30 inches.

E. A fifth independent tube fits inside the fourth helical coil, an exact duplicate of the fourth but with an outer diameter of 24 inches.

F. The tubes are connected on a horizontal plane so that entering gas mixtures are directed first into the No. 1 (inside) tube at the top level. The gases travel around the helical pattern (at a pre-determined velocity due to an applied force in the form of pressure), to reach the bottom of the tube No. 1. The gases travel (at the bottom of tube No. 1), through a connecting tube to the bottom of tube No. 2, to enter that tube and spiral helically around tube No. 2 till they reach the top. At this point a connecting tube transfers the moving gas-stream to the top of tube No. 3 where it spirals around and down to the bottom of tube 3, to enter the bottom of tube 4, where it spirals upward to reach the top of tube 4, transfers to the top of tube 5, flows spirally downward to the bottom of tube 5 . . . then out through the exit tube.

VOID VOLUME IN TOTAL (a) Tube No. 1 is $\approx 2,111.15$ (inches long)
(b) Tube No. 2 is $\approx 2,638.94$ (inches long)
(c) Tube No. 3 is $\approx 3,166.72$ (inches long)
(d) Tube No. 4 is $\approx 3,694.51$ (inches long)
(e) Tube No. 5 is $\approx 4,222.30$ (inches long)

The total length of the tube is 15,833.62 inches (1,319.47 ft.), or 402.17 meters.

Assume the SS walls have a thickess of 0.200, then the inner diameter (ID) equals 1.6 inches, and the radius equals $1.6/2 = 0.80$ (in.), $0.80^2 = 0.64$ Then, the area of a circle equals $\pi r^2 = 3.1416 \times 0.64 = 2.0106$ (in$^2$) and: 2.0106 (in$^2$) $\times$ 15,833.62 (length)

| VOID VOLUME = 31,835.382 (cubic inches) |
| --- |
| $\dfrac{31,835.382 \text{ (ci)}}{1728 \text{ (ci/cf)}} = 18.4233$ (cu. ft.) |

Assuming the tube is filled with the mixed gases CO+O. The mass of CO equals 33.48 grams per cubic foot, and the mass of O equals 19.13 grams per cubic ft., therefore the combination equals 52.61 grams per cubic foot.

$\sigma 18.4233$ (cf) $\times 52.61$ (g) $= 969.2474$ grams at one atmosphere pressure (14.7 Psi)

Assume we are operating at 5.0 atmos. (or 73.5 psig), then we would have a mass of $5.0 \times 969.2474$ grams of the mixed gases within the tube, for a total mass of 4,846.24 (grams), or 10.684 pounds.

EXAMPLE

Recall that in the c.g.s. system of units the unit of force is called a dyne. A dyne (as stated earlier), is that force which will produce an acceleration of 1 cm. per second per second when acting on a mass of 1 g. A poundal is defined as that force that will produce an acceleration of 1 ft. per second per second in a mass of 1 pound.

A quick calculation evidences tht the oxygen atom O, is only 57.1192 percent of the mass of the CO molecule.

DISCUSSION
FORCES AND MOTIONS

A force is an action exerted by one body on another, tending to change the state of motion of the body acted upon.

The primary effects of a force are two: A force may cause a change in the size, or shape, or density, of a body; or if the body is free to move, a force can cause a change in velocity. This change in velocity may be a change in the direction of the motion, or a change in the magnitude of the velocity, or both.

DISCUSSION
NEWTON'S FIRST LAW OF MOTION

This law states that every body continues in a state of rest or uniform motion in a straight line, unless it is compelled to change that state by the application of some external force.

For motions of rotation, the law states that every body continues in a state of uniform motion of rotation about a fixed axis unless acted upon by some impressed force applied at some point not on the axis of rotation.

DISCUSSION
INERTIA

In Newton's first law of motion an important property of matter appears. It is known an inertia and is defined as that property of matter by virtue of which it tends to remain at rest or in uniform motion unless external forces are acting on it. ROTARY INERTIA depends on the distribution of the mass about the axis of rotation.

DISCUSSION
UNIFORM CIRCULAR MOTION

If a body or mass moves in a circular path in such a way that it always passes over equal distance in equal intervals of time, it is said to have uniform circular motion. The magnitude of its velocity is constant, however, its direction of motion is constantly changing. Such a body has an acceleration, however, this acceleration consists in a change in the direction.

In uniform circular motion the acceleration toward the center $= v^2/R$.

Of course, a force is necessary to produce a change in the direction of the motion of the body, just as a force is necessary to produce a change in the rate of motion.

Since, in a circular motion this force produces no change in the magnitude of the velocity but only a change in the direction of motion, the force must act at right angles to the direction of motion. Since the force is at right angles to the direction of motion and the motion is in a circular path, the force is along the radius of the circle and directed toward the center of the circle.

A normal circle with a fixed radius determines the rate at which the direction of motion is changing, is constant, and the force that produces it must therefore be constant.

DISCUSSION
ACCELERATION IN UNIFORM CIRCULAR MOTION

In uniform circular motion with a fixed radius, there is at every instant an acceleration, there is at every instant an acceleration towards the center. To calculate this acceleration, assume that a particle passes over the arc AB, with a constant speed $v$ in the time t. The space passed over in this time is AB=$v$t.

The direction of motion of the body has changed but it continues to move tangent to the circle. The angle $\theta$ between the radii OA and OB is equal to the angle between the velocity of the body at A and its velocity at B.

To find the rate of change of the velocity, draw two vectors $v_o$ and $v_t$, each of the same magnitude $v$.

These vectors differ only in direction. The velocity of the body at A is represented by the vector $v_o$ and the velocity at B by the vector $v_t$. The angle $\theta$ is the change in the direction of motion.

In order to change the velocity from $v_o$ to $v_t$, an additional velocity must be added to the body. If a is the rate of change of the velocity, that is, the acceleration, and t, the time for the body to move from A to B, the change in velocity is at. This is the velocity which must be added to cause the velocity of the body to change from $v_o$ to $v_t$. To find this change of velocity, draw $v_o$ and $v_t$ from a common point S, making an angle $\theta$ with each other.

Close the triangle thus formed by drawing a third vector which is equal to the change of velocity in the time t. When the angle $\theta$ is small, the chord AB, is nearly equal to the Arc AB, and the two triangles AOB and MSN are similar.

$$\text{Then } \frac{AB}{R} = \frac{MN}{v}$$

$$\frac{vt}{R} = \frac{at}{v}.$$

and $$a = \frac{v^2}{R}.$$

This acceleration is directed toward the center of the circle.

If $\omega$ is the angular velocity of the radius, $$v = \omega R$$

$$a = \frac{\omega^2 R^2}{R} = \omega^2 R$$

This expression may be written in another form. If N denotes the number of revolutions per second, $$v = 2\pi RN.$$

$$a = \frac{4\pi^2 R^2 N^2}{R} = 4\pi^2 RN^2.$$

From this last expression it becomes evident that the acceleration increases when the radius of the path is increased, and it also increases when the number of revolutions is increased.

DISCUSSION

CENTRIPETAL FORCE

Newton's second law of motion states that whenever an acceleration is produced, a force must be applied.

It has been seen that a body moving in a circular path with uniform velocity has an acceleration toward the center of the circle. To produce this acceleration and to keep the body from flying off tangent to the circle, a force must be applied at right angles to the direction of motion.

This force which is directed toward the center of the circle is called the CENTRIPETAL force.

To find its magnitude, recall the Newtons second law of motion is $$F = Ma$$

Now the acceleration in the case of uniform circular motion is $$a = \frac{v^2}{R},$$

$$\text{when } F = Ma = M\frac{v^2}{R}$$

$$\text{or} = 4\pi^2 RN^2 M$$

This force is necessary to keep the body moving in a circular path.

The reaction this moving body produces due to the constraint is called the CENTRIPETAL FORCE.

The centrifugal force is equal in magnitude but opposite in direction to the centripetal force.

A centripetal force is induced by directing a body of mixed gases of Δ, differential masses, into and through a series of circular tubes of design diameter, volume, and radius. The tubes constrain the moving body of gas induce the heavier molecules into a laminar or stratified flow just within the outer radius of the tubes (on the inside of the tubes).

This outer wall of the tube provides the centripetal force by constantly directing the gas flow inwardly around the circle as the heavier molecules of CO gas accumulate in a dense strata and displace the light oxygen atoms inwardly away from the CO strata, assisted by an induced negative pressure controlled precisely to remove the lighter oxygen atoms continuously from the circular orbiting, with the oxygen atoms exiting through escape holes in the inner wall of the tubes—for that purpose only, and designed in size and shape to function as stated.

In this unit, under the forces and constraints as described, the difference in the masses (ΔM) of the moving gases under pressure at a good velocity (and their tendencies to move at high speed in a straight line within the tube), makes it possible to separate the gases as they travel quickly about an axis.

The heavier gas ($CO_{(g)}$) at 28.01055 grams per gram-mole, is literally thrown outward to the furthest distance possible within the tube itself—and the lighter gas ($O_{(g)}$) atoms are moved away and out of the negative pressure exhaust port—then delivered separately as a second product $O_2$, as they recombine into oxygen molecules as they cool down to a lower temperature.

Induced (real) laminar flows occur due to stratification of ΔM, differential masses of 'many' gases—allowing a good separation of those gases even at very high working temperatures.

The carefully controlled negative pressure removes the lighter gas or gases from the circular tube system as the gases move at good velocities through the circular tubes and stratify.

DISCUSSION
ABSOLUTE UNITS OF FORCE

Newton's second law of motion gives a satisfactory way of defining an absolute unit of force.

By suitably choosing the unit of mass, the unit of force, and the unit of acceleration, the factor of proportionality becomes equal to unity and Newton's second law of motion takes the form $$F = Ma$$

This equation implicitly defines the absolute unit force as the force which will produce unit acceleration when acting on unit mass. In the c.g.s. system of units, this unit of force is termed a dyne. A dyne is 'defined' as that force which will produce an acceleration of 1 cm. per second per second when acting on a mass of 1 gram. A poundal is defined to be that force that will produce an acceleration of 1 ft. per second per second in a mass of one pound.

FORCE (DEFINITION)

That which changes the state of rest or motion in matter, measured by the rate of change of momentum. ABSOLUTE UNIT, the dyne, is that force which will produce an acceleration of one centimeter per second per second in a gram mass. The gram weight, or weight of a gram mass, is the cgs gravitational unit.

The force F required to produce an acceleration a in a mass m is given by $$F = ma$$

when m is substituted in grams and a in cm per sec$^2$, F will be given in dynes.

NOTE

To convert dynes into joules/cm, multiply by the constant $10^{-7}$ (A) CONSIDER TUBE NO. 1, LENGTH 5362.3 cm, RADIUS 30.48 (cm.), CONVEYING CO (g)

Assume a mass of 33.48 grams of CO gas (1.0 cf), has an acceleration of 17,556.48 cm. per second, from an orifice of 0.6350 cm. dia. directly into tube No. 1, whose I.D. = 1.6 in. (4.06 cm).

$$CO_{(g)}, F = ma = 33.48_{(g)} \times 17{,}556.48 \text{ (cm)}$$
$$= \boxed{587{,}790.95 \text{ dynes}}$$

(1) When a mass moves in a uniform circular motion with linear speed 300 cm/sec ($v$), it is accelerated toward the center of the circle with an acceleration, a, given by $$a = v^2/\gamma$$

$$a = \frac{300 \text{ cm/sec}^2}{30.48 \text{ cm}}$$

$$a = 2952.755 \text{ cm/per sec}$$

$$= 300 \text{ (cm/sec)} = 2952.755 \text{ (cm/sec)}$$

$$v = 3252.76 \text{ (cm/sec)}$$

(2) Knowing the magnitude and the direction of the acceleration of a mass in uniform circular motion, it is convenient to compute the force which acts on the mass. If the mass is m, we find with application of Newtons second law $$F = \frac{mv^2}{\gamma} = m\omega^2\gamma$$

where the mass is 33.48 (g)
velocity = 3252.7559 (cm/sec)$^2$
$\Psi$ = 30.48 cm
$\omega$ = angular speed $$F = \frac{33.49 \text{ (g)} \times 10580420.94}{30.48 \text{ cm}}$$

$$F = \boxed{11{,}621{,}800.95 \text{ (dynes)}}$$

Converting dynes into joules/cm = (x) $10^{-7}$
(a) 11,621,800.95(dynes) $\times 10^{-7}$ = 1.16 (joules/cm)
(b) tube length 5362.321 (cm.)

$$5362.321 \times 1.16 \text{ (j/cm)} = \boxed{6231.98 \text{ (j)}}$$

equals the force acting toward the center to keep the mass moving in a uniform circular motion for the length of the tube—likewise, this represents the centrifugal force which is equal but opposite in direction.

(c) The total force required to keep 33.48 grams of CO gas moving in a uniform circular motion within No. 1 tube for the length of the tube becomes 11,621,800.95 (dynes) + 587,790.75 (dynes) = 12,209,590.75 (dynes)

and converting to joules/cm $$12{,}209{,}590.75 \times 10^{-7} = 1.22 \text{ (joules/cm)}$$

(d) tube length 5362.321 (cm)

then dividing $\frac{5362.321 \text{ (cm)}}{300 \text{ (cm/sec)}} = 17.8784$ (Unit Seconds)

then: 17.8744 $\times$ 1.22 (jouls/cm) = 21.807 (j/cm)

and: 21.807 $\times$ 300 (cm/sec) = $\boxed{6542 \text{ (j/tube)}}$ (B) CONSIDER THE SAME TUBE CONVEYING O ATOMS Assume a mass of 19.13 grams of oxygen atoms has an acceleration of 17,556.48 cm. per second, from the same orifice of 0.6350 cm. diameter.

$$(O_{atoms}): F = Ma = 19.13 \times 17{,}556.48 \text{ (cm)}$$
$$= \boxed{335{,}855.46 \text{ dynes}}$$

$$a = v^2/\gamma \qquad (1)$$

$$\therefore a = \frac{300 \text{ (cm/sec)}^2}{30.48}$$

-continued
= 2952.7559 cm/sec then:
acceleration=300 (cm/sec)=2952.7559
a=3252.76 cm/sec $$F = \frac{mv^2}{\gamma} = m\omega^2\gamma \quad (2)$$

where
mass=19.13 (g)
$v$=3252.7559 (cm/sec)
$\gamma$=30.48 (cm)
$\omega$=300 (cm/sec)$^2$ $$F = \frac{19.13 \text{ (g)} \times 10580420.94}{30.48 \text{ (cm)}}$$

$$F = \boxed{6{,}640{,}533.2 \text{ (dynes)}}$$

(3) The total force required to keep this mass of O atoms moving in a uniform circular motion at 3252.7559 cm/sec within No. 1 tube, equals $$6{,}640{,}533.2 + 335{,}855.46 \text{ (dynes)} = \boxed{6{,}976{,}388.68 \text{ (dynes)}}$$

(a) Converting dynes to joules per cm (a constant) $(x)$ $10^{-7}$ $6{,}976{,}388.68 \times 10^{-7}$ = 0.69764 (joules/sec)

(b) Tube No. 1 is 5362.32 (cm.) long then dividing $\frac{5362.32 \text{ (cm)}}{300 \text{ (cm/sec)}} = 17.8744$ (Unit Seconds)

then: $17.8744 \times 0.697639 = 12.469876$ (j/cm)

and: $12.469876 \times 300$ (cm/sec) = $\boxed{3{,}740.963 \text{ (j/tube)}}$ (C) COMPARING $\Delta$ FORCE REQUIRED FOR $\Delta$M Notice that moving the CO (gas) mass of 33.48 (g) (1 cu ft), required 6,542 joules, and moving the O (gas) atoms mass of 19.13 (g) (1 cu ft), required 3,740.96 joules.

(1) The oxygen atoms actually required about 43 percent as much energy as the CO molecules, "to maintain the same uniform circular motion for the same distance traveled."

(2) Since the exact amount of force (energy) was delivered to both examples, the oxygen, O, atoms would have traveled considerably faster through the tube than the CO molecules. Actually the O atoms would have separated from the CO molecules and have responded to an induced laminar flow stream traveling 43 percent (approximately) faster than the heavier CO flowing laminar stream of its own.

(3) The $\Delta$M affects the molecules and atoms in another very important way. All movement of mass "preferentially" goes in a straight line with uniform speed, while the tube within which the mass is moving turns in a continuous uniform circle. The trajectories of the moving gas and the curbing tube wall intersect continuously, therefore the heavier CO gas, $\Delta$M, is continuously impacting and moving along the tube wall in an ever increasing density of CO molecules as that laminar (layer) moves through the length of the tube.

The lighter oxygen, O, atoms are not affected to the same degree by the continuously curving and constraining wall of the tube, because the O atoms are lighter, they rise above the CO flow and at this point the removal of oxygen atoms begins.

(4) Since the circular tubes are all horizontal and the continuous curving coils bring the CO molecules to the inside of the outer wall where their packed density slides along as a (for practical purposes) separate flow-stream.

The lighter (47 percent) oxygen atoms ride in their separate flow stream on the inner side of the tube.

What is claimed is:

1. A system for the separation of gases of different molecular weights comprising:
a plurality of concentric coils of tubing mounted inside one-another;
means for connecting the end of each coil to one end of the next coil;
a housing enclosing said coils;
means for supplying mixed gases of significantly different molecular weights to said coils at high velocity; and
said coils having small openings on the extreme inner or outer surfaces thereof on coils other than the input turn or turns of tubing to permit the selective flow of one of said two gases into said enclosing housing while the bulk of the other of said two gases continues to flow through said tubing.

2. A system as defined in claim 1 further including means for collecting the gas from said enclosing housing.

3. A system as defined in claim 1 further comprising a gas storage container, and means for transferring gas collected in said enclosing housing to said storage container.

4. A system as defined in claim 3 wherein said transferring means includes a pump.

5. A system as defined in claim 3 wherein said transferring means includes means for changing the effective volume of said storage container to reduce the pressure therein.

6. A system as defined in claim 5 including means for pumping water into and out of said gas storage container.

7. A system as defined in claim 6 further comprising float means on the water in said storage container.

8. A system as defined in claim 6 wherein said system includes a water storage tank, and means for pumping water back and forth between said water storage tank and said gas storage container.

9. A system as defined in claim 1 wherein said openings are on the inner surfaces of the coils of tubing, whereby the lighter gas is selectively collected in the enclosing housing.

10. A system for the separation of gases of significantly different molecular weights comprising:
means for directing mixed gases of significantly different molecular weights through a channel to produce a significant circular component of motion in said gases to produce laminar flow with the heavier gas toward the outside of said channel, and the lighter gas toward the inside of said channel;

port means in the wall of said channel at one extreme inner or outer surface of said channel to permit the separation or retrieval of one of said gases while the other gas continues to flow in said channel; and means for receiving and containing the separated gas which has passed through said port means.

11. A system as defined in claim 10 further comprising a gas storage container, and means for transferring gas collected in said receiving and containing means to said storage container.

12. A system as defined in claim 11 wherein said transferring means includes a pump.

13. A system as defined in claim 11 wherein said transferring means includes means for changing the effective volume of said storage container to reduce the pressure therein.

14. A system as defined in claim 13 including means for pumping water into and out of said gas storage container.

15. A system as defined in claim 10 wherein said channel includes at least one coil including a plurality of turns of tubing, and wherein said port means are on the inner surfaces of the tubing.

16. A system for the separation of gases of different molecular weights comprising:

a plurality of concentric coils of tubing mounted inside one-another;

means for connecting the end of each coil to one end of the next coil;

a housing enclosing said coils;

means for supplying hot gas including carbon monoxide and monatomic oxygen to said coils at high velocity;

said coils having small openings on the extreme inner surfaces thereof on coils other than the input coil of tubing to permit the selective flow of the oxygen into said enclosing housing while the bulk of the carbon monoxide continues to flow through said tubing;

a gas storage container; and means for transferring gas collected in said enclosing housing to said storage container.

17. A system as defined in claim 16 wherein said transferring means includes a pump.

18. A system as defined in claim 16 wherein said transferring means includes means for changing the effective volume of said storage container to reduce the pressure therein.

19. A system as defined in claim 18 including means for pumping water into and out of said gas storage container.

20. A system as defined in claim 19 further comprising float means on the water in said storage container.

* * * * *